(12) United States Patent
You et al.

(10) Patent No.: US 9,162,777 B2
(45) Date of Patent: Oct. 20, 2015

(54) APPARATUS AND METHOD FOR MONITORING STATUS OF SATELLITE

(71) Applicant: Electronics and Telecommunications Research Institute, Daejeon (KR)

(72) Inventors: Moon Hee You, Daejeon (KR); Jin Ho Jo, Daejeon (KR); Jae Hoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/104,883

(22) Filed: Dec. 12, 2013

(65) Prior Publication Data

US 2014/0222255 A1  Aug. 7, 2014

(30) Foreign Application Priority Data

Feb. 1, 2013  (KR) ........................ 10-2013-0011903

(51) Int. Cl.
*G01W 1/10* (2006.01)
*B64G 1/24* (2006.01)

(52) U.S. Cl.
CPC ........................................ *B64G 1/24* (2013.01)

(58) Field of Classification Search
CPC ....... G06F 19/3418; G01W 1/10; H04L 43/08
USPC ................ 701/3, 10, 415; 455/121, 122, 123, 455/12.1, 24, 3.02, 3.01, 9, 13.4, 303, 455/414.1, 422.1, 423, 427, 456.1; 342/354, 352, 355, 357.22; 702/3; 250/301, 394, 461.1

See application file for complete search history.

(56) References Cited

U.S. PATENT DOCUMENTS

| | | | |
|---|---|---|---|
| 6,052,588 A * | 4/2000 | Mo et al. ........................ | 455/430 |
| 6,320,536 B1 * | 11/2001 | Sasaki ....................... | 342/357.62 |
| 6,850,187 B1 * | 2/2005 | Clark ....................... | 342/357.395 |
| 7,103,480 B2 | 9/2006 | Intriligator et al. | |
| 7,400,292 B2 * | 7/2008 | DiLellio .................. | 342/357.31 |

FOREIGN PATENT DOCUMENTS

| | | |
|---|---|---|
| KR | 10-2009-0066623 | 6/2009 |
| KR | 10-2013-0073600 | 7/2013 |

* cited by examiner

*Primary Examiner* — Dalena Tran
(74) *Attorney, Agent, or Firm* — Kile Park Reed & Houtteman PLLC

(57) ABSTRACT

Provided is an apparatus and method for monitoring a status of a satellite, including classifying satellite telemetry information and space weather information and storing the information in a storage unit including respective databases, predicting whether a predetermined type of satellite failure occurs based on the space weather information, and generating satellite control command information to change a status of a predetermined satellite configuration when a satellite failure determining index used to determine a possibility of the satellite failure is beyond a predetermined critical alert range.

18 Claims, 4 Drawing Sheets

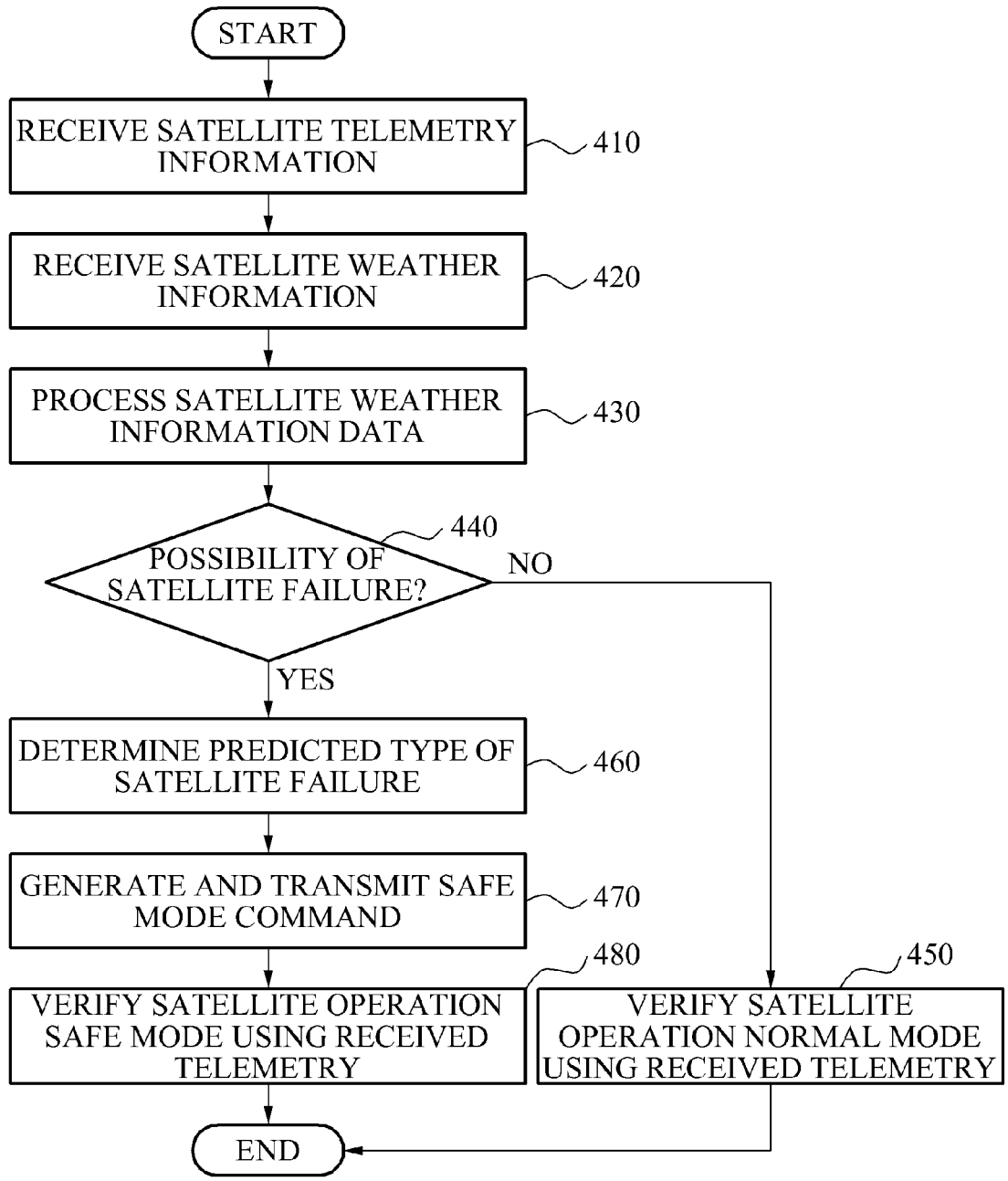

APPARATUS AND METHOD FOR MONITORING STATUS OF SATELLITE

CROSS-REFERENCE TO RELATED APPLICATION

This application claims the priority benefit of Korean Patent Application No. 10-2013-0011903, filed on Feb. 1, 2013, in the Korean Intellectual Property Office, the disclosure of which is incorporated herein by reference.

BACKGROUND

1. Field of the Invention

The present invention relates to an apparatus and method for monitoring a status of a satellite that may monitor the status of the satellite in consideration of an influence of space weather conditions, and thus automatically control a satellite configuration based on a result of an analysis.

2. Description of the Related Art

A general satellite transponder monitoring and control (TMC) system may manually receive telemetry information of a satellite transponder, store the received information in a database, display a result of the storing on a display, and transmit telecommand information commanded by a system operator at a particular time.

A general satellite transponder monitoring apparatus may receive telemetry information of a satellite transponder, parse the telemetry information, send a result of the parsing to a database management system (DBMS) to store the result in a database, and indicate each telemetry value graphically or numerically through a telemetry viewer.

Also, the general satellite transponder monitoring apparatus may make reference to analog telemetries of telemetries stored in the database, perform a statistical analysis involving a minimum value, a maximum value, a mean value, distribution, and the like, and display a result of the analysis through an analysis data indicator. Further, the general satellite transponder monitoring apparatus may transmit a satellite control command in response to a manual input of the system operator based on a particular schedule or at a scheduled time according to a series of a selected command procedure.

The satellite transponder may be affected directly by a weather phenomenon occurring in space, for example, a solar storm, because a satellite transponder is located in space beyond the atmosphere, and thus may be prone to malfunctions or failure.

In a case in which the TMC system receives telemetry information of the satellite transponder at regular time intervals, although space weather conditions are quite likely to cause malfunctions or failure, rapid collection of information and prompt measures for responding to an event may be required.

However, during operation of the system, even in an ordinary status, similar to a case of an emergency status, a ground system may be unnecessarily overloaded. Thus, research on development a system that may precisely diagnose and monitor a status of a satellite is necessary.

SUMMARY

According to an aspect of the present invention, there is provided an apparatus for monitoring a status of a satellite including a storage unit to classify received satellite telemetry information and received space weather information and store the information in respective databases, a satellite failure predicter to predict whether a predetermined type of satellite failure occurs based on the space weather information, and a satellite control command generator to generate satellite control command information to change a mode of a predetermined satellite configuration when a satellite failure determining index used to determine a possibility of satellite failure is beyond a predetermined critical alert range.

The satellite status monitoring apparatus may further include a telemetry receiver to receive the satellite telemetry information from the satellite in real time and a space weather information receiver to receive the space weather information from a satellite weather observatory in real time.

The satellite status monitoring apparatus may further include an information transmitter to transmit the space control command information to the satellite.

The satellite status monitoring apparatus may further include an information display to display the satellite telemetry information, the space weather information, and the satellite control command information.

The information display may centrally display the satellite telemetry information from a point in time at which a satellite failure alert occurs.

The satellite status monitoring apparatus may further include an information analyzer to analyze the satellite telemetry information and the space weather information and generate the analyzed information.

The satellite status monitoring apparatus may further include a satellite telemetry information database to store the satellite telemetry information, a space weather information database to store the space weather information, a satellite failure information database to store satellite failure information, and a satellite control command information database to store the satellite control command information.

The satellite control command generator may generate the satellite control command information to change a mode of a satellite configuration corresponding to the predetermined type of satellite failure when the satellite failure determining index is beyond the critical alert range.

The satellite control command generator may generate the satellite control command information to change a mode of a satellite configuration corresponding to the predetermined type of satellite failure to a normal mode when the satellite failure determining index is within the critical alert range.

The satellite control command generator may generate the satellite control command information to enable the satellite to select a safe mode or an alternative safe mode when an internal charging is predicted to occur in the satellite.

According to another aspect of the present invention, there is provided a method of monitoring a status of a satellite including classifying received satellite telemetry information and received space weather information and storing the information in respective databases, predicting whether a predetermined type of satellite failure occurs based on the space weather information, and generating a satellite control command information to change a status of a predetermined satellite configuration when a satellite failure determining index used to determine a possibility of the satellite failure is beyond a predetermined critical alert limit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating a method of monitoring a status of a satellite according to an embodiment of the present invention.

DETAILED DESCRIPTION

Figure 1:
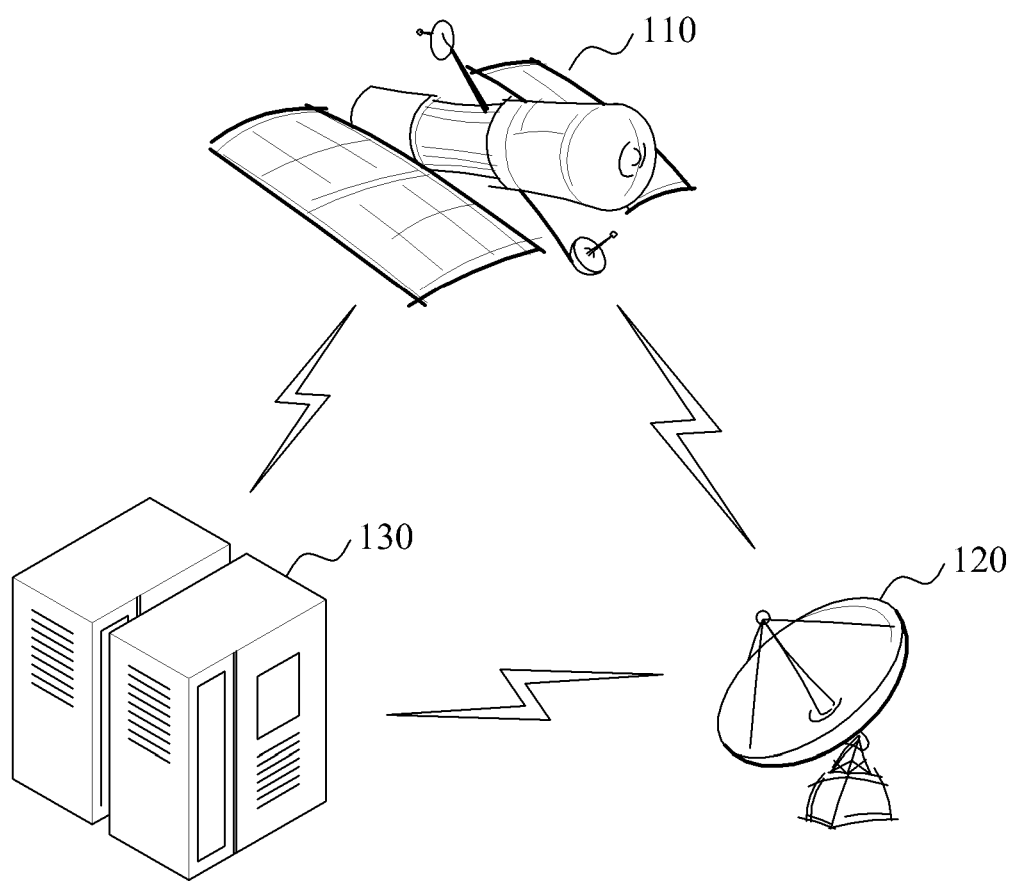
FIG. 1 illustrates a configuration of an entire system for monitoring a status of a satellite according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying figures, however, the present invention is not limited thereto or restricted thereby.

When it is determined detailed description related to a related known function or configuration they may make the purpose of the present invention unnecessarily ambiguous in describing the present invention, the detailed description will be omitted here. Also, terminology used herein is defined to appropriately describe the exemplary embodiments of the present invention and thus may be changed depending on a user, the intent of an operator, or a custom. Accordingly, the terms must be defined based on the following overall description of this specification.

FIG. 1 illustrates a configuration of an entire system for monitoring a status of a satellite according to an embodiment of the present invention.

Referring to FIG. 1, a satellite status monitoring apparatus 130 may receive satellite telemetry information from a satellite 110, receive space weather information from a space weather observatory 120, and monitor a status of the satellite based on the received satellite telemetry information and the received space weather information.

As used herein, telemetry refers to transmitting data to be measured through a wire or a radio circuit. Due to a broadcasting satellite being positioned approximately 36,000 kilometers (km) above the Equator, a telemetry method may be used to send, to the ground, data pertaining to whether a status of each portion of the satellite is in a good condition or whether a command given from the ground is implemented as instructed. Items measured through telemetry may include various types of information such as, a temperature of a satellite, a voltage and current of power supply, an attitude of a transmission power satellite, and a pressure of jet fuel remaining for attitude control. Also, telemetry information may also be used to measure a distance from the ground to a satellite.

Figure 2:
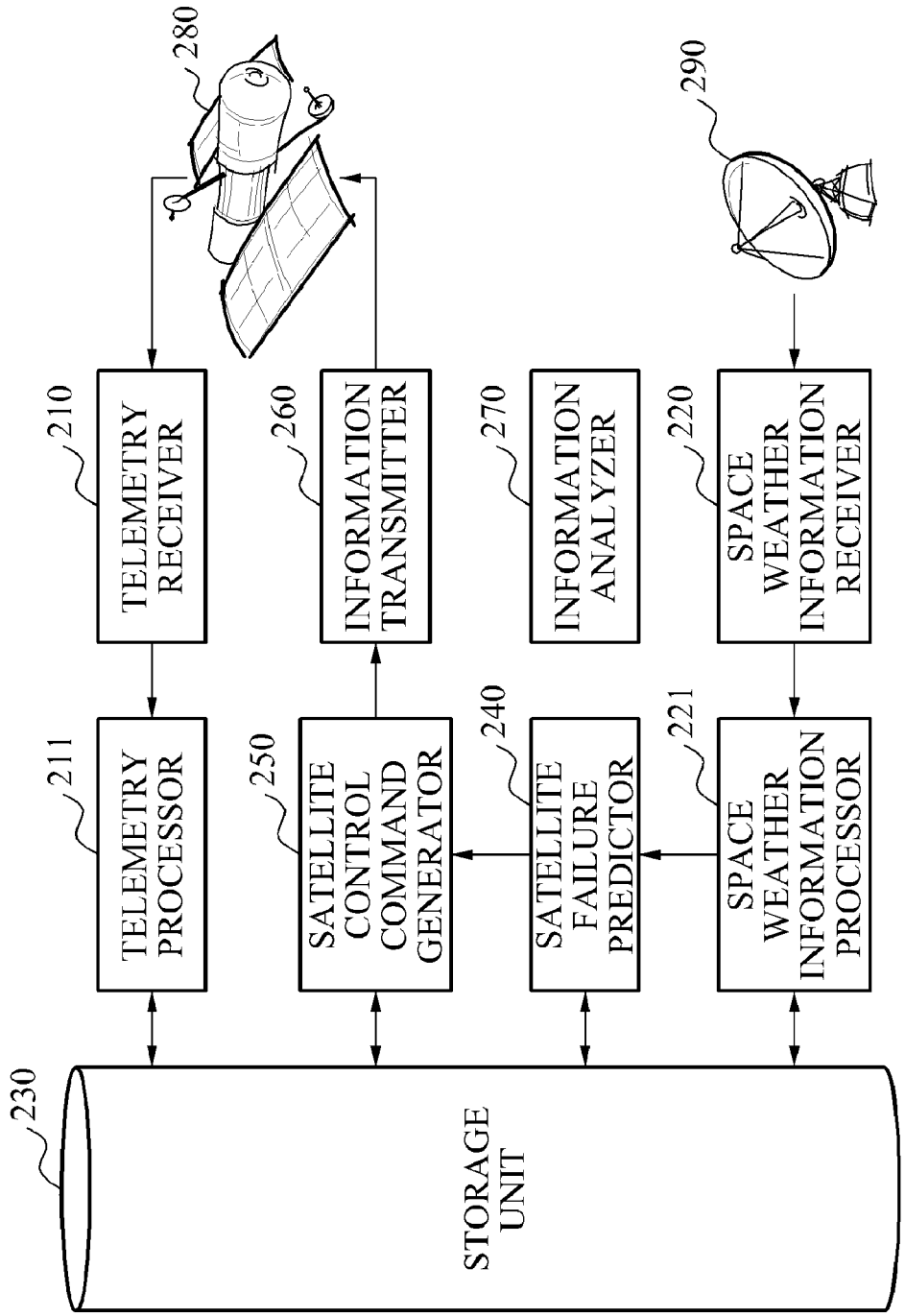
FIG. 2 is a block diagram illustrating a configuration of an apparatus for monitoring a status of a satellite according to an embodiment of the present invention.

FIG. 2 is a block diagram illustrating an apparatus for monitoring a status of a satellite according to an embodiment of the present invention.

Referring to FIG. 2, the satellite status monitoring apparatus may include a storage unit 230, a satellite failure predictor 240, and a satellite control command generator 250. Further, the satellite status monitoring apparatus may include a telemetry receiver 210 that may receive satellite telemetry information from a satellite 280 in real time and a space weather information receiver 220 that may receive space weather information from a space weather observatory 290 in real time.

The storage unit 230 may classify the received satellite telemetry information and the received space weather information and store the information in respective databases (DBs). A telemetry processor 211 may identify the received telemetry information to store the information in the storage unit 230, and a space weather information processor 221 may identify the received space weather information to store the information in the storage unit 230.

Figure 3:
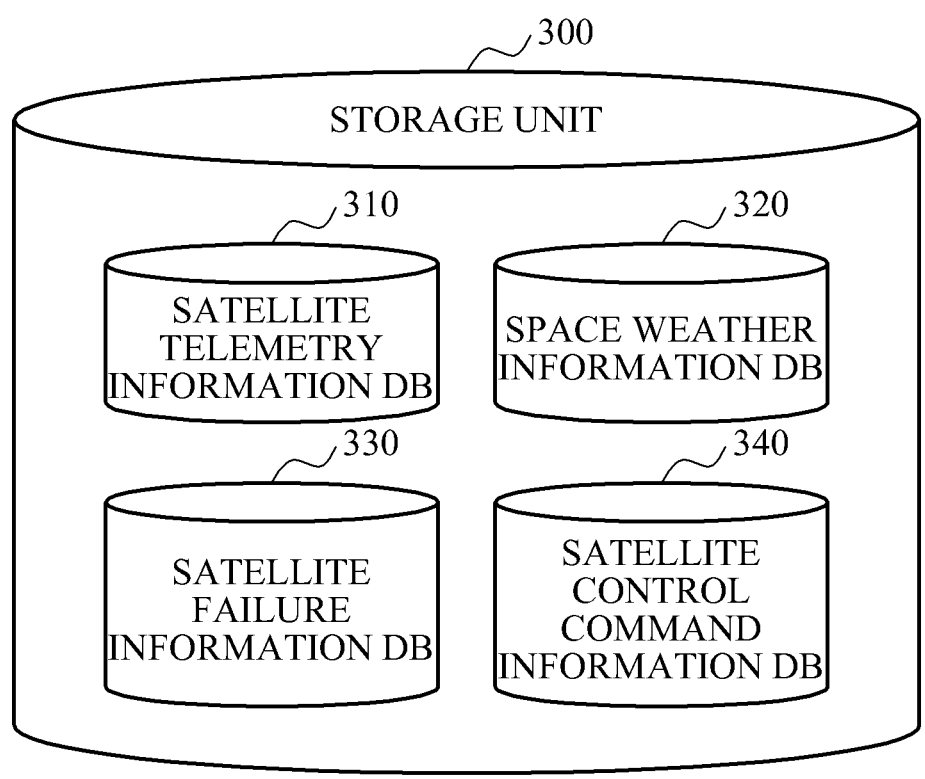
FIG. 3 is a block diagram illustrating a configuration of a storage unit according to an embodiment of the present invention.

FIG. 3 is a block diagram illustrating a configuration of a storage unit 300 according to an embodiment of the present invention.

Referring to FIG. 3, the storage unit 300 may include a satellite telemetry information DB 310 used to store satellite telemetry information, a space weather information DB 320 used to store space weather information, a satellite failure information DB 330 used to store satellite failure information, and a satellite control command information DB 340 used to store satellite control command information.

Referring to FIG. 2 again, the satellite failure predictor 240 may predict whether a predetermined type of satellite failure occurs based on space weather information.

The satellite control command generator 250 may generate satellite control command information to change a status of a predetermined satellite configuration when a failure determining index used to determine a possibility of satellite failure is beyond a predetermined critical alert range.

The satellite status monitoring apparatus of FIG. 2 may further include an information transmitter 260 that may transmit the satellite control command information to the satellite 280.

The satellite status monitoring apparatus may display the satellite telemetry information, the space weather information, and the satellite control command information through an information display (not shown). For example, the information display may centrally display the satellite telemetry information from a point in time at which a failure alert occurs in the satellite 280.

The satellite status monitoring apparatus may further include an information analyzer 270 that may analyze the satellite telemetry information and the space weather information and generate the analyzed information.

The satellite status monitoring apparatus may automatically transmit a satellite control command to the satellite 280 to change a mode of a satellite configuration corresponding to a predicted type of satellite failure to a safe mode when the space weather information is beyond a predetermined critical warning or alert value determining a possibility of satellite failure.

For example, the satellite control command generator 250 may generate the satellite control command information to change a mode of a satellite configuration corresponding to a failure type of the satellite 280 to the safe mode when the satellite failure determining index is beyond the predetermined critical alert range.

Also, the satellite control command generator 250 may generate the satellite control command information to enable the satellite 280 to select the safe mode or an alternative safe mode when an internal charging is predicted to occur in the satellite 280.

The storage unit 230 may store not only the telemetry information of the satellite 280 inputted in real time, but also the space weather information inputted through the space weather information receiver 220, after processing the information by using a particular weighting function in the telemetry processor 211 and the space weather information processor 221.

The satellite status monitoring apparatus may improve the accuracy of satellite failure prediction by continually accumulating and storing satellite failure information and learning the information.

For example, an excessive input of a high energy proton due to a solar flare or coronal mass ejection (CME) may cause a single event upset (SEU) error in a satellite transponder. According to an embodiment of the present invention, the satellite status monitoring apparatus may transmit a satellite control command used to enable a satellite to select a safe mode or an alternative safe mode to protect digital apparatuses used for the satellite, because it is highly possible that an error may occur in operating digital memory bits when high energy proton measuring data of the inputted space weather information exceeds a predetermined critical value.

For example, the satellite status monitoring apparatus may transmit a proper safe mode control command to protect against damage to a solar panel of a satellite that may be caused by a surface charge when a Kp index, a geomagnetic index indicating a geomagnetic storm, is measured to be a critical value in a certain time slot. Here, the satellite status monitoring apparatus may control a satellite configuration to automatically operate in a normal mode again when the space weather information inputted in real time is within a normal range.

The satellite status monitoring apparatus may transmit a satellite control command used to enable a satellite to select a proper safe mode or an alternative safe mode for active satellite components when an internal charge is predicted to occur due to a high energy electron measured over a certain period of time.

The satellite status monitoring apparatus may centrally display related telemetry information based on a point in time at which a space weather warning or alert occurs and minimize a possibility of a satellite error by continually managing the related telemetry analysis data until an event ends.

FIG. 4 is a flowchart illustrating a method of monitoring a status of a satellite according to an embodiment of the present invention.

Referring to FIG. 4, the satellite status monitoring apparatus may receive satellite telemetry information from a satellite in real time in operation 410, and receive space weather information from a space weather observatory in real time in operation 420.

In operation 430, the satellite status monitoring apparatus may classify the received satellite telemetry information and the received space weather information, and store the information in a storage unit including respective DBs.

In operation 440, the satellite status monitoring apparatus may predict whether a predetermined type of satellite failure occurs based on the space weather information. The satellite status monitoring apparatus may generate satellite control command information to change a status of a predetermined satellite configuration when a satellite failure determining index used to determine a possibility of the satellite failure is beyond a predetermined critical alert range.

In operation 450, the satellite status monitoring apparatus may verify whether a satellite operates in a normal satellite operation mode based on the received telemetry when the satellite failure determining index does not exceed the predetermined critical alert range.

When the satellite failure determining index is beyond the predetermined critical alert range, the satellite status monitoring apparatus may determine a type of a predicted failure in operation 460, and generate and transmit a satellite control command to enable the satellite to select a safe mode in operation 470. Here, in operation 480, the satellite status monitoring apparatus may verify whether the satellite operates in a safe satellite operation mode using the received telemetry.

According to an embodiment of the present invention, the satellite status monitoring apparatus may use an analysis result obtained based on real-time space weather conditions, determine a critical range of a real-time status of a satellite, take an immediate and automatic measure, and thus manage the status of the satellite more precisely. Further, the satellite status monitoring apparatus may promptly prevent a possibility of satellite failure by comparing, at the same time, all the space weather data over a certain period of time with respect to the statuses of certain components of the satellite.

According to an embodiment of the present invention, the satellite status monitoring apparatus may centrally provide and analyze satellite telemetry information received in real time, based on the information about space weather conditions inputted in the system.

According to an embodiment of the present invention, the satellite status monitoring apparatus may change and control a status of a satellite automatically, promptly, and accurately based on a predetermined procedure when it is highly possible that an obtained analysis result falls under a certain critical range.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for monitoring a status of a satellite, comprising:
a storage unit to receive and store satellite telemetry information and space weather information;
a satellite failure predictor to predict whether a predetermined type of satellite failure occurs based on the space weather information; and
a satellite control command generator to generate satellite control command information to change a mode of a satellite configuration corresponding to the predetermined type of satellite failure to a safe mode when a satellite failure determining index for determining a possibility of the satellite failure is beyond a predetermined critical alert range.

2. The apparatus of claim 1, further comprising:
a telemetry receiver to receive the satellite telemetry information from the satellite in real time; and
a space weather information receiver to receive the space weather information from a space weather observatory in real time.

3. The apparatus of claim 1, further comprising:
an information transmitter to transmit the satellite control command information to the satellite.

4. The apparatus of claim 1, further comprising:
an information display to display the satellite telemetry information, the space weather information, and the satellite control command information.

5. The apparatus of claim 4, wherein the information display centrally displays the satellite telemetry information from a point in time at which a satellite failure alert occurs.

6. The apparatus of claim 1, further comprising:
an information analyzer to analyze the satellite telemetry information and the space weather information, and generate analyzed information.

7. The apparatus of claim 1, wherein the storage unit comprises:
a satellite telemetry information database to store the satellite telemetry information;
a space weather information database to store the space weather information;
a satellite failure information database to store satellite failure information; and
a satellite control command information database to store the satellite control command information.

8. The apparatus of claim 1, wherein the satellite control command generator generates the satellite control command information used to change the mode of the satellite configuration corresponding to the predetermined type of satellite failure to a normal mode when the satellite failure determining index is within the predetermined critical alert range.

9. The apparatus of claim 1, wherein the satellite control command generator generates the satellite control command information used to enable the satellite to select the safe mode or an alternative safe mode when internal charging is predicted to occur in the satellite.

10. A method of monitoring a status of a satellite, the method comprising:
receiving and storing satellite telemetry information and space weather information in a storage unit comprising at least one database;
predicting, by a satellite failure predictor, whether a predetermined type of satellite failure occurs based on the space weather information stored in the storage unit; and
generating, by a satellite control command generator, satellite control command information to change a mode of a satellite configuration corresponding to the predetermined type of satellite failure to a safe mode when a satellite failure determining index for determining a possibility of the satellite failure is beyond a predetermined critical alert range.

11. The method of claim 10, further comprising:
receiving the satellite telemetry information from the satellite in real time; and
receiving the space weather information from a space weather observatory in real time.

12. The method of claim 10, further comprising:
transmitting the satellite control command information to the satellite.

13. The method of claim 10, further comprising:
displaying the satellite telemetry information, the space weather information, and the satellite control command information.

14. The method of claim 10, further comprising:
displaying, centrally, the satellite telemetry information from a point in time at which a satellite failure alert occurs.

15. The method of claim 10, further comprising:
analyzing the satellite telemetry information and the space weather information and generating analyzed information.

16. The method of claim 10, wherein the storage unit comprises:
a satellite telemetry information database to store the satellite telemetry information;
a space weather information database to store the space weather information;
a satellite failure information database to store satellite failure information; and
a satellite control command information database to store the satellite control command information.

17. The method of claim 10, further comprising:
generating the satellite control command information to change the mode of the satellite configuration corresponding to the predetermined type of satellite failure to a normal mode when the satellite failure determining index is within the predetermined critical alert range.

18. The method of claim 10, further comprising:
generating the satellite control command information to enable the satellite to select the safe mode or an alternative safe mode when an internal charging is predicted to occur in the satellite.

* * * * *